United States Patent
Koschany

(10) Patent No.: US 6,890,675 B2
(45) Date of Patent: May 10, 2005

(54) METHOD OF OPERATING A FUEL CELL SYSTEM, AND FUEL CELL SYSTEM OPERABLE ACCORDINGLY

(75) Inventor: Petra Koschany, Strasskirchen/Salzweg (DE)

(73) Assignee: Manhattan Scientifics, Inc., Los Alamos, NM (US)

( * ) Notice: Subject to any disclaimer, the term of this patent is extended or adjusted under 35 U.S.C. 154(b) by 52 days.

(21) Appl. No.: 10/019,231
(22) PCT Filed: Mar. 27, 2001
(86) PCT No.: PCT/EP01/03488

§ 371 (c)(1),
(2), (4) Date: Dec. 28, 2001

(87) PCT Pub. No.: WO01/73877

PCT Pub. Date: Oct. 4, 2001

(65) Prior Publication Data

US 2003/0012986 A1 Jan. 16, 2003

(51) Int. Cl.⁷ ............................ H01M 8/10; H01M 8/04
(52) U.S. Cl. .......................................... 429/26; 429/13
(58) Field of Search ...................... 429/13, 26

(56) References Cited

U.S. PATENT DOCUMENTS

| | | | |
|---|---|---|---|
| 4,138,510 A | | 2/1979 | Koziol et al. |
| 4,582,765 A | * | 4/1986 | Kothmann ............ 429/13 |
| 4,931,168 A | | 6/1990 | Watanabe et al. |
| 5,240,786 A | | 8/1993 | Ong et al. |
| 5,631,099 A | | 5/1997 | Hockaday |
| 5,759,712 A | | 6/1998 | Hockaday |
| 5,846,669 A | | 12/1998 | Smotkin et al. |
| 5,856,036 A | | 1/1999 | Smotkin et al. |

FOREIGN PATENT DOCUMENTS

| | | | | |
|---|---|---|---|---|
| JP | 59117074 A | * | 7/1984 | ............ H01M/8/02 |
| WO | WO 99/67845 | * | 12/1999 | ............ H01M/8/02 |

OTHER PUBLICATIONS

Vielstich, Wolf: *Fuel Cells Modern Processes for Electrochemical Production of Energy;* Wiley Interscience, New York: Copyright 1970 (Originally published 1965).

Srinivasan et al.: *Fundamental Equations of Electrochemical Kinetics at Porous Gas–Diffusion Electrodes;* Jrnl. of Chemical Physics, vol. 46, No. 8; Apr. 15, 1967; pp. 3108–3122.

Hockaday, Robert G.; *Development and Modeling of the Homoporous Electrode Fuel Cell;* Masters Thesis (Abstract); New Mexico State University, Las Cruces, NM; Dec. 1984.

(Continued)

Primary Examiner—Carol Chaney
(74) Attorney, Agent, or Firm—James Creighton Wray; Meera P. Narasimhan

(57) ABSTRACT

For simplifying cooling of a fuel cell system which may be a single cell (1), a stack (15) or a similar configuration and which comprises at least one active membrane (2) sandwiched between an anode layer (4) and a cathode layer (3) and comprising a catalyst, a fuel supply having access to the anode layer and an air supply (17, 18) having access to the cathode layer, while at the same time keeping the effectivity of the system with reference to energy conversion, volume and weight favourable, the fuel cell system is to be operated such that the air which is supplied by the air supply, is introduced by pressure into the fuel cell system, passes along the cathode layer and then leaves the fuel cell system, is used for both oxidant and coolant. For this purpose, the air is introduced into the fuel cell system (1, 15) with a rate resulting in a stoichiometric rate in the range between 25 and 140.

21 Claims, 3 Drawing Sheets

OTHER PUBLICATIONS

N. L. Abbott et al.; *Manipulation of the Wettability of Surfaces On the 0.1 to 1 Micrometer Scale . . .*; Science, vol. 257, Sep. 4, 1992; pp. 1380–1382.

S. R. Narayanan et al.; *Electrochemical Characteristics of Carbon–supported Pt, Pt–Sn, Pt–Ru Electrodes . . .*; Unknown technical Publication; pp. 233–236.

J. Joyce, J. Leddy; *Composite Ion Exchange Membranes: Microstructure and Mass Transport;* (Abstract); Unknown Technical Meeting at Atlanta, GA Proceedings; vol. 135, No. 3; 198?; p. 139C.

J.S.Batzold; *From Electrocatalysts to Fuel Cells;* Unknown Technical Pubication; Jun. 8, 1972; pp. 224–229.

P.D.Naylor et al.; *A Novel Anode System for the Direct Methanol Fuel Cell;* Unknown Technical Publication; pp. 575–577.

S.Sarangapani et al.; *Advanced Corrosion–Resistant Coatings for Fuel Cell Applications;* Unknown Technical Publication; dated post–1990; pp. 167–170.

Boris D. Cahan; *The Mechanisms of Electrodic Reactions on Porous Surfaces;* Ph.D. Dissertation in Chemistry; Univ. of Pennsylvania; 1968; Cover only.

* cited by examiner

METHOD OF OPERATING A FUEL CELL SYSTEM, AND FUEL CELL SYSTEM OPERABLE ACCORDINGLY

The invention relates to a method of how to operate a fuel cell system which comprises at least one active membrane sandwiched between an anode layer and a cathode layer and comprising a catalyst, and a fuel supply having access to the anode layer and an air supply having access to the cathode layer, wherein the air supplied by the air supply is introduced by pressure into the fuel cell system, passes along the cathode layer and then leaves the fuel cell system and is used for both oxidant and coolant, and to a fuel cell system operable according to such method and comprising at least one active membrane sandwiched between an anode layer and a cathode layer and comprising a catalyst, and a fuel supply having access to the anode layer and an air supply having access to the cathode layer. It concerns a combination of the functions of a reactant supply and a cooling gas stream, particularly in a proton exchange membrane (PEM) electrochemical fuel cell system having cathode structure through which an air flow passes.

BACKGROUND OF INVENTION

U.S. Pat. No. 5,595,834 describes a cylindrical stack of cells in which the movement of an air stream including the necessary oxygen is from the periphery toward a central hollow cylindrical region. That air stream has the function of providing the fuel cell with the necessary oxygen for the reaction within the single cells. For cooling, separator plates between the cells extend a certain distance beyond the stack periphery for removing heat from said cells to the ambient air. The passway of the hydrogen fuel is within the central region near the centres of the cells and is connected to deliver the fuel to fuel flow fields in the cells.

U.S. Pat. No. 5,470,671 describes a fuel cell configuration in which all cathode sides of the cells (single cells arranged in a line, connected in series or bicells) are located at the periphery of the cell arrangement. The cathode is the periphery of each single cell. Therefore, it is possible to dissipate all heat generated exothermically in the membrane electrode assembly to the atmosphere, and to supply the necessary reaction air stream to the membrane within the same flow path. The reaction and cooling air steam are identical. A problem resulting from the prior art configuration is a large volume that is necessary since a conventional bipolar stack configuration is not possible. Furthermore, complicated gas supply and electrical connections are necessary which generally do not allow a large number of cells which would be needed to generate high voltages. The energy densities in weight and volume, and even the efficiency of this configuration are very low.

EP 0 929 112 describes an air-cooled hydrogen air polymer electrolyte fuel cell that has a twofold channel structure cooling plate. The cooling channel structure extends through the plate from a first side to a second side of the plate, wherein the air channel structure that supplies the fuel cell with the reaction air extends from a surface of a cathode flow field into the cooling channel of the cooling plate. The cooling air stream and the reaction air steam flow cross-sectionally.

DE 196 00 200 C1 describes a fuel cell wherein one of two dry or only partially humidified reactant gases flows parallel to the temperature gradient between the reaction gas inlet and the reaction gas outlet. In addition, an air flow is used for cooling purpose.

On the other hand DE 40 28 339 A1 discloses a fuel cell system in which an excess of hydrogen is used as reaction gas and coolant simultaneously. This requires additional means of recovering none-reacted hydrogen and cycling it back through the fuel cell system what again results in high complexity and low energy densities in weight and volume.

SUMMARY OF THE INVENTION

By the invention, cooling of a fuel cell system which may be a single cell, a stack or a similar configuration is to be simplified while at the same time the effectivity of the system with reference to energy conversion, volume and weigh are to be kept favourable.

The invention uses an air flow with a high stoichiometric rate. This air flow con the reaction gas oxygen for the electrochemical reaction at the cathode catalyst layer, and, furthermore, mainly the nitrogen contained in the air flow is used as a cooling gas. The reaction and cooling air stream are identical and are fed directly to the cathode compartment with such high stoichiometric rate. Depending on operating conditions and electrode structures, the stoichiometric rate is in the range of 25 to 140, more preferably in the range of 45 to 90. Due to that large air flow, the fuel cell is supplied with oxygen optimally and equally all over the surface of the cathode. Furthermore, the waste heat is removed directly from the cathode electrode. The air flow is preferably spread in a channel structure over the whole active area. Additional cooling fluid and cooling compartment or cooling fins are not necessary.

In accordance with the present invention, the channel system of the cooling plate is much more simplified. A special cooling plate with a twofold channel structure is not necessary. Furthermore, the gas distribution at the surface of the membrane is very uniform and efficient because the reaction oxygen is taken away by diffusion from the cooling air flow. This uniformity results in a constant humidity of the membrane and therefore in a constant and high power output. Only two gas streams are used, the cooling and reaction air flow are identical. This allows for minimization of peripheral aggregates and reduces the complexity of he fuel cell stack. In one preferred embodiment of the present invention, there is a cylindrical cell in which there is an air flow from the central region to the periphery or vice versa.

The reaction oxygen leaves the air flow by diffusion through appropriate, preferably multi-layered, cathode diffusion structures. The concentration gradient that drives the oxygen diffusion flow is generated by the oxygen consumption of the cathode catalyst if electrical current is produced by the cell.

In this context the stoichiometric rate is defined as the factor br which the amount of oxygen in the actually applied air flow is higher than the amount of oxygen that is necessary for the chemical reaction in order to produce an actual electric power output.

The fuel cell may either be a single cell or a stack configuration in the geometrical form of a rectangle. The rectangular shape has the advantage that the pressure drop within the air flow is relatively small if the flow is directed parallel to the short edge of the rectangle. Each single cell comprises a membrane, a multi-layered and diffusion limited anode, and a multi-layered and diffusion limited cathode. The cathode air conducting layer for the reaction and cooling air stream may have channels. The air conducting layer may be made of a porous or a non-porous material.

Alternatively the geometrical form of the fuel cell stack may be cylindrical. The individual cells tire have a circular ring shape. The air flow is supplied in the axial direction by means of one or two blowers located at one or two endplates. On the one hand, the blowers can be attached to the endplates in a way that the electric motors of the blowers protrude from the cylindrical body of the stack, on the other hand the blowers may be completely contained in the central tube space within the stack. The adage of this geometrical arrangement compared to a rectangular one is that there are no air manifolds necessary that guide the air flow from the blower to the singe cells in the stack and that spread the air equally to the individual cells. The function of the manifold is provided by the inner cross section of the cells.

Therefore, weight and volume are saved. Instead of the circular ring shape, other geometrical ring-like forms may be used, such as an elliptical ring or a square with a central square hole. Furthermore, the ring-like shape may be achieved by arranging several cells, perhaps belonging to different stacks, in a convenient way in order to save air supply manifolds.

Preferably, the air flow is directed from the outer surface of the fuel cell stack to the inner tube, but an air flow in the opposite direction may be used too. As a further possibility the air flow direction may be alternatingly reversed after certain time spans.

These and further objects and features of the invention will become apparent in the following description of preferred embodiments of the invention, referring to the drawings.

DETAILED DESCRIPTION OF THE EMBODIMENT OF THE INVENTION

Figure 1:
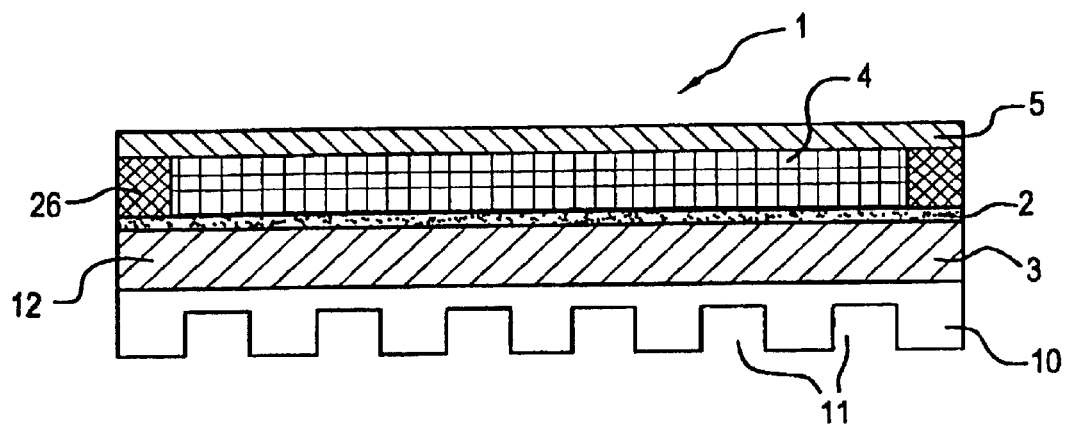
FIG. 1 is a diagrammatic front view of a fuel cell with a far configuration.

An electrochemical fuel cell 1 according to FIG. 1 comprises a membrane 2, a cathode diffusion structure 3 at one side of the membrane 2, and an anode 4 at the other side of the membrane 2. The anode 4 is covered by an endplate which in case of a fuel cell stark is a bipolar plate 5, and the cathode structure 3 is covered by a flow field which is an air conducting layer 10 wherein air conducting channels 11 are formed. An end or bipolar plate covering the air conducting layer 10 is not shown in FIG. 1. At both sides of the membrane 2, on the surface thereof or on surfaces of the adjacent layer structures, there is a catalyst for enabling the desired reaction between $H_2$ and $O_2$ generating $H_2O$ at the cathode side and an electric voltage or current to be collected from the anode and cathode which constitute the electrodes of each cell. The cathode diffusion structure 3 allows air from the air conducting layer 10 to penetrate to a front area at the catalyst and membrane, and allows $H_2O$ vapour to escape from this front area.

The air flow passes through the cathode diffusion structure 3 with a high stoichiometric rate. The stoichiometric rate means the ratio of the total oxygen input to the chemical oxygen consumption. This air flow contains the reaction gas oxygen for the electrochemical reaction at the cathode catalyst layer, and, furthermore, mainly the nitrogen contained in the air flow is used as a cooling gas. The reaction and cooling air flows are identically one single flow which is fed directly to the cathode structure with the mentioned high stoichiometric rate. Depending on operating conditions and electrode structures, the stoichiometric rate is in the range of 25 to 140, more preferably in the range of 45 to 90. Due to that high air flow, the fuel cell is supplied with oxygen optimally and equally all over the surface of the cathode. Furthermore, the waste heat is removed directly from the cathodic electrode. The air flow is spread in a channel structure provided by the channels 11 over the whole active area of the cathode and membrane. An additional cooling fluid and a cooling compartment, or cooling fins are not necessary.

The reaction oxygen leaves the air flow by diffusion tough the cathode diffusion structure 3 which is appropriately dimensioned for the purpose and preferably comprises, preferably multi-bred cathode diffusion structures. The concentration gradient that drives the oxygen diffusion flow is generated by the oxygen consumption caused by cathode cast if electrical current is taken off from the cell.

If due to the high stoichiometric air flow the membrane 2 tends to dry out and to lose its ion conductivity at elevated operating temperatures, such consequence can be avoided by diffusion limited cathode and anode structures as described in WO 00/14816 are used, which is hereby incorporated by reference. This document teaches a polymer-electrolyte membrane fuel cell comprising a laminate of such membrane, an electrode containing a catalyst, a porous, electrically conductive gas diffusion layer and a cut collector plate containing a gas distribution channel structure, and further having a gradient of the gas permeability, which gradient is present at least in a partial area, in the laminate in the direction perpenticulary to the membrane, with a higher gas permeability loser to the membrane an a lower gas permeability closer to the current collector plate wherein in operation at the membrane by a hylogen-oxygen reaction water and heat are produced, and wherein the gas permeability gradient exists in the gas diffusion layer which is adjacent to the electrode containing catalyst, and at least in this partial area of the gas diffusion layer the gas permeability close to the current collector plate is lower to such a degree than in the vicinity of the membrane that a gas composition occurs which over the surface of the membrane is approximately constant; while the water which at the operating temperature is generated in vaporform creates such a water vapor diffusion stream through the gas diffusion layer that the humidity content of the membrane which is optimal for the conductivity is materially being maintained. Now, applying anode 4 and cathode 3 structures with extreme water retention properties, manufactured strictly according to the methods disclosed in WO 00/14816, cell operating temperatures of more than 70° C. near the outlet are allowed to be achieved despite the large air volume passing the cathode. The air flow is generally not further humidified before entering the cathode compartment.

The air flow causes a first temperature difference, i.e. of the air between inlet and outlet ($\Delta T_{air}$), and a second temperature difference, i.e. ($\Delta T_{el}$) within the electrode structure bet air inlet and outlet. The $\Delta T_{el}$ should be as small as possible, otherwise uniform humidity of the membrane is hard to maintain. A high $\Delta T_{el}$ causes a different moistening of the membrane. At the inlet of the air flow in the fuel cell, the product water is retained relatively well within the membrane because of the low temperature of the electrode material and the cooling and reaction air flow at this place.

Rather, the electrode pores are in the danger of flooding. At the outlet of the air flow, with its higher temperatures, the moistening of the membrane is generally smaller so that the membrane is in danger of drying out. This is the reason of designing the cathode diffusion structure as disclosed in WO 00/14816 and thus to maintain optimal membrane humidity despite (small) temperature gradients. Methods to reduce the temperature gradients will be disclosed in Example 3. Therefore, $\Delta T_{el}$ is preferably less than 25° C., and most preferably less than 8° C. In example 3, a method to reduce $\Delta T_{el}$ by means of a parallel heat conducting layer, i.e., the bipolar plate 45, is described.

On the other hand, $\Delta T_{air}$ should be as high as possible, otherwise the stoichiometric rate of the air flow has to be increased to a level such that the power demand of blowers generating the air flow decreases the efficiency of the whole system in an unreasonable way. $\Delta T_{air}$ is preferably higher than 15° C., and most preferably higher than 30° C. The surface of the cathode diffusion structure presented to the air flow, and the resulting heat transfer rate between diffusion structure and air flow are preferably designed in a way ending up with a temperature difference of less than 12° C. between the air outlet and the cathode diffusion structure near the outlet. Most preferably this temperature difference is kept less than 7° C. Methods to achieve a high heat transfer rate are to increase the common surface between air and diffusion structure and to enhance the flow velocity. Both is achieved, in the described embodiment, by the air conducting layer 10 which serves as a cathode flow plate, comprising a large number of the narrow channels 11. Furthermore, the heat transfer rate is enhanced by using rectangular channel cross sections and a porous channel wall material.

The above mentioned methods to increase the heat transfer rate tend to increase the pressure drop that is necessary to force the air through said channel structure as well. The energy consumption of the blower is thereby enhanced. However, it is typical for the present invention that no further heat removal system is necessary.

EXAMPLE 1

Still with reference to FIG. 1, the fuel cell 1 may either be a single cell as shown, or a stack configuration which in this embodiment has the geometrical form of a parallelepiped the section of which is a rectangle. The rectangular shape has the advantage that the pressure drop within the air flow is relatively small if the flow is directed parallel to the short edge of the rectangle. As shown in FIG. 1, each single cell consists of the membrane 2, the cathode diffusion structure 3 which is a multi-layered and diffusion limited cathode, and the anode 4 which is a multi-layered and diffusion limited anode. The anode 2 and cathode 3 are manufactured according to WO 00/14816. The cathode air conducting layer 10 is made of a porous or a nonporous material. For the reaction and cooling air flow it comprises the channels 11. If a nonporous material is used for the air conducting layer 10, the channel structure 11 is necessary. If a porous material is used, the channel structure 11 may be applied or not. The opposite side surface of layer 10 is a non-channelled side 12 facing the membrane 2.

In one preferred embodiment, the porous material of the air conduction layer 10 is a graphite paper i.e. TGPH-1.5t from Toray, Inc. Japan. The channel structure 11, 1.1 mm in deep and 1.0 mm in width, with 1.2 mm between the channels, is milled in the graphite paper. The air conducting layer 4 disperses the oxygen equally on the surface of the cathode diffusion structure 3 because of the high stoichiometric air flow rate and the highly porous structure of the air conduction layer adopted in this embodiment. It may be advantageous to wet proof the air conducting layer 4 by using a commercially available PTFE dispersion. Diffusion structure 3 and air conducting layer 10 prevent the membrane 2 from drying out. The adopted anode 4 is a diffusion limited anode used to prevent a large amount of water from evaporating at the membrane 2 towards the compartment of the anode 4 and condensing at the bipolar plate 5 which is cooled from the air flow of the next cell. This water vapour is typically lost for membrane humidification, because recycle mechanisms are rather complicated.

EXAMPLE 2

Figure 2:
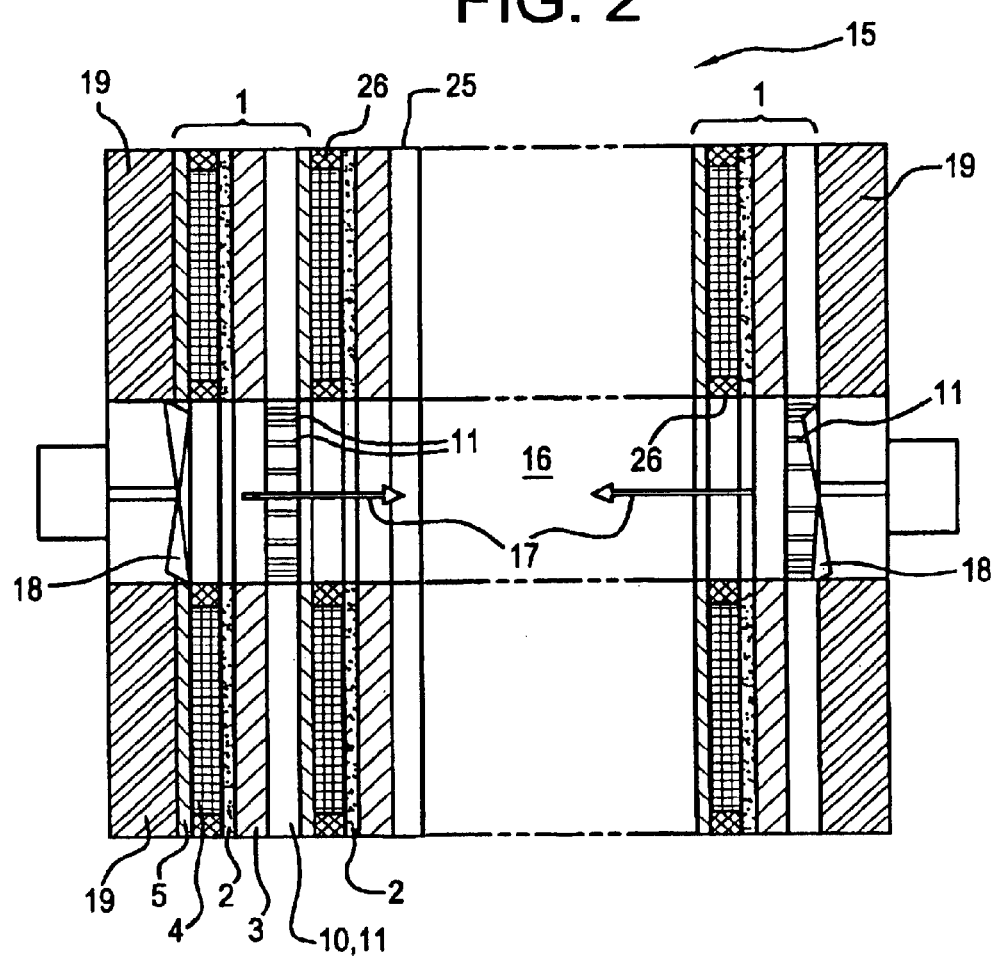
FIG. 2 is cross section through a circular fuel cell stack with two blowers.
Figure 4:
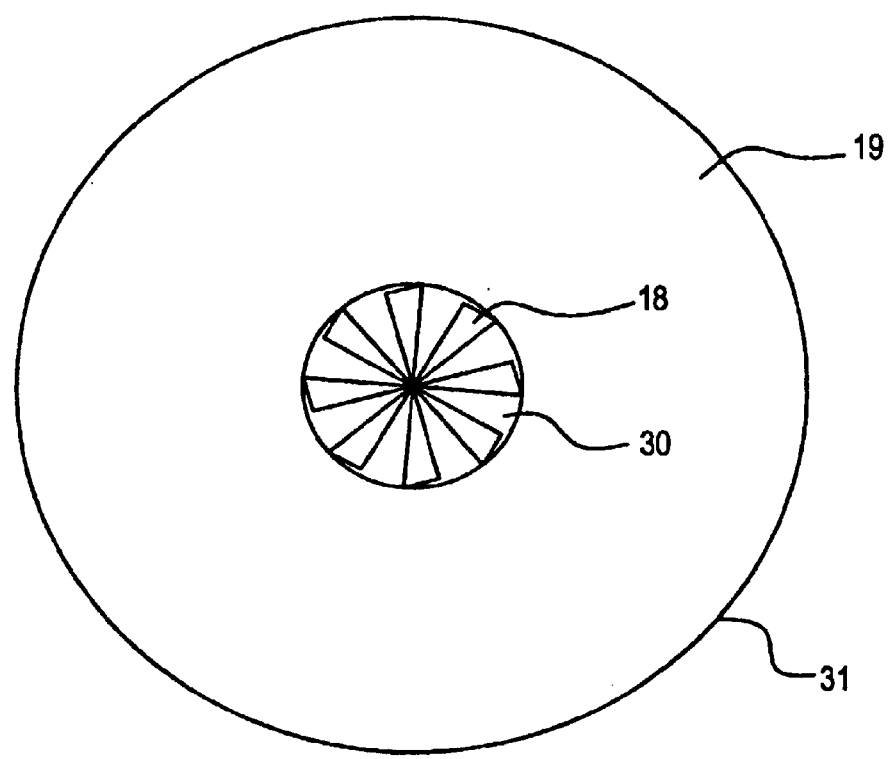
FIG. 4 is a top view of the circular fuel cell of FIG. 3.

In another preferred embodiment shown in FIG. 2, a fuel cell stack 15 has the geometrical form of a hollow circular cylinder or very nearly so, forming some sort of an axial tube space 16. The individual cells 1 thereof have a circular ring shape, as shown in FIG. 4. The air flow 17 is supplied in axial direction into the tube space 16 by means of one or two blowers 18 located at one or respectively two endplates 19. The air flow 17 is directed from the axially outer surfaces 24 of the fuel cell stack 15 into the inner tube space 16 and penetrates through the individual cells toward the peripherally outer surface 25.

The advantage of this geometrical arrangement compared to a rectangular one is that there are no air manifolds necessary for guiding the air flow 17 from the blower 18 to the cells 1 and spreading the air equal to the individual cells. The function of the manifold is provided by the tube space 9 formed by the inner cross sections of the cells 1. Therefore, weight and volume are saved. Instead of the circular ring shape, other geometrical ring-like shapes may be used, such as an elliptical ring or a square with a central square hole. The ring-lie shape may also be achieved by arranging several cells, perhaps belonging to different stacks, in a convenient way in order to save air supply manifolds.

The anode 4 of each cell is sealed by ring-shaped sealings 26 toward the inner tube space 16 and the outer surface 25 of the cylindrical arrangement. The sealings 26, the anode 4, the cathode diffusion structure 3, the bipolar plates 5 and the hydrogen supply and mechanical compression system are designed as described in WO 00/02279, WO 00/14816, DE 199 17 722.8 and in WO 00/10174, respectively which are hereby incorporated by reference, the latter reference teaching an electrically conductive, flexible, and mechanically stable layer material containing a preformed, conductive, porous lay material which contains non-metallic particles as a conductive component, wherein the pores of the preformed layer material are completely or partially filled with a cured resin, and the conductive particles are to an essential extent not coated with this resin.

Figure 5:
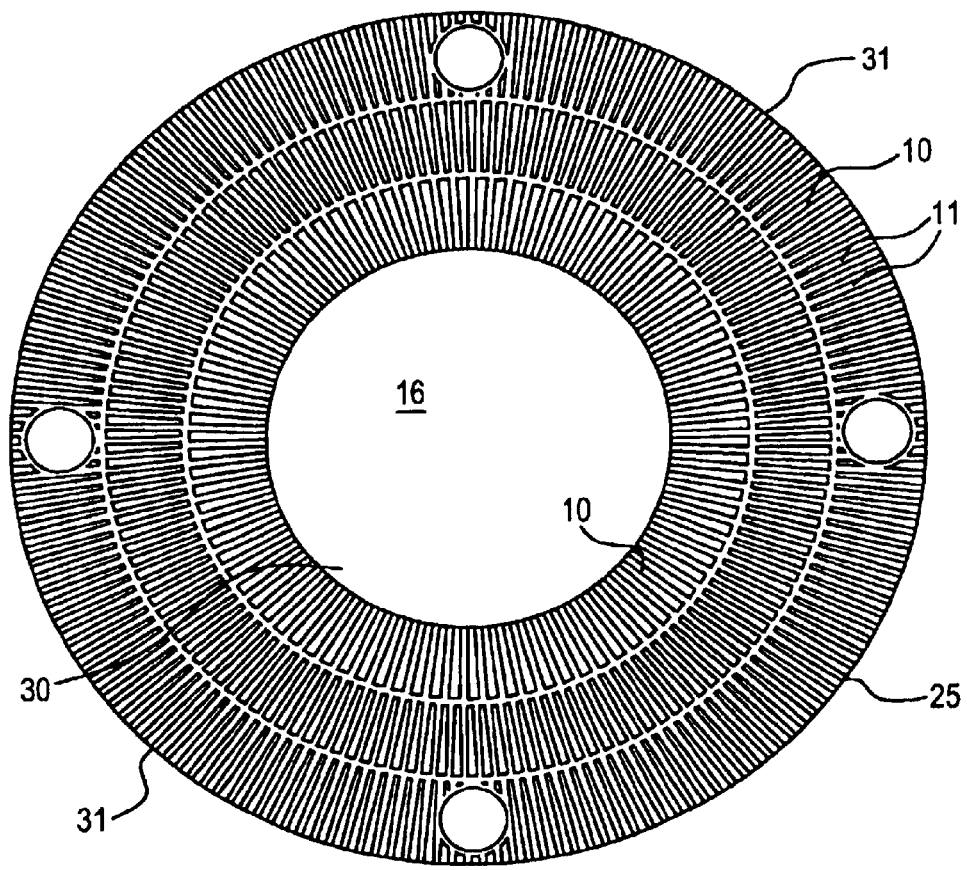
FIG. 5 is a top view of an air conducting layer of a fuel cell.

The air conducting layer 10, as part of the cathode, is constructed as shown in FIG. 5.

In order to determine a reasonable diameter for the inner tube space 16 formed by the individual cells 1, the static pressure along the tube should vary only a little bit (less than 10%) compared to the pressure drop that occurs within the air conducting layers 10. This results in an equal flow rate distribution between the individual cells 1. For this reason, the decrease of static pressure in the inner tube space 16 due to friction and the increase of static pressure due to the reduction of dynamic pressure (flow speed) depending on the distance from the blower 18 need to be taken into account. Generally the use of two blowers 18, as shown in FIG. 2, one at each cylinder endplate 19, allows for a smaller inner diameter compared to a one blower arrangement.

EXAMPLE 3

The high stoichiometric rate of the cooling and reaction air flow and the resulting temperature gradients, especially the $\Delta T_{el}$, may result in different humidification states within the membrane 2, especially if dry reaction gases are used, thereby lowering the power output.

Of course the electrode diffusion structures described in WO 00/14816 allow for compensation of the temperature gradient by non-uniformity of the electrode itself. In high temperature regions the electrode structure has to be more dense in order to reduce the effective diffusion coefficient for water vapour, thereby keeping the water within the membrane 2. However, it turned out that the manufacturing process of such non-uniform electrodes is rather complicated, especially if the degree of non-uniformity is high.

There are several methods to substantially reduce the temperature gradients arising due to the cooling method of the present invention.

Figure 3:
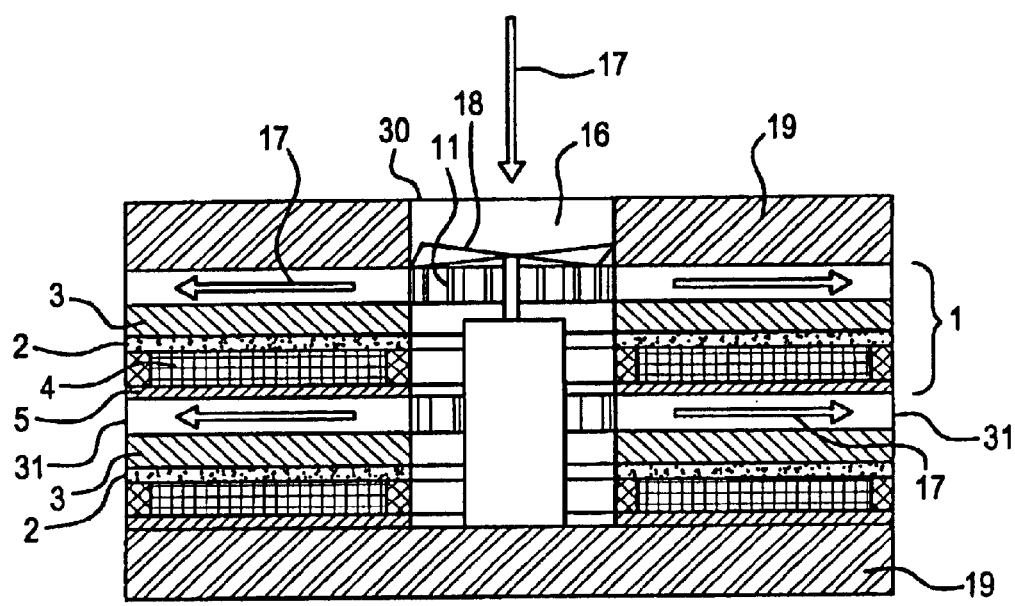
FIG. 3 is cross section through a circular fuel cell stack with one blower.

The most simple method is reversing the air flow direction after certain time intervals. FIGS. 3 and 5 show an air inlet 30 and an outlet 31 which are part of the cell 1. The inlet and outlet functions are changed alternatingly. After reversing the direction, the temperature at the former outlet 31 is reduced whereas the temperature at the former inlet 30 rises. In average, this results in a nearly equal temperature distribution.

Another method is to use bipolar plates 5 that have a high heat conductivity parallel to the plate. This causes heat to be transported through the bipolar plates from the hot air outlet region to the relatively cold air inlet region. To avoid unreasonably high masses of the bipolar plates 5, a material with high specific heat conductivity may be chosen. Metals like aluminium, magnesium, beryllium and their alloys; graphite; and most preferably foils of pressed expanded graphite flakes have good properties. The foils made of expanded graphite have extremely anisotropic heat conductivity properties. The conductivity parallel to the plane is extremely high compared to the rather low density of the material. It turned out that satisfying results may be achieved by compressing the foils until a density of 1.1 g/cm$^3$ to 1.9 g/cm$^3$, and more preferably a density of 1.25 g/cm$^3$ to 1.45 g/cm$^3$, is achieved. In order to get the foils gastight they may be impregnated with a resin before or after the production process. Preferably, phenolic-, furan- or epoxy resins are used.

Another method of reducing $\Delta T_{el}$ between the air inlet 30 and air outlet 31 regions at a given stoichiometric rate is by enhancing the heat transfer rate per unit active area toward the air outlet. In this case, the electrode temperature rises slower than the air temperature towards the outlet region. The channel structure of the cylindrical stack design of Example 2 as presented in FIG. 5 shows this property. Assuming that the air flow is directed from the outer surface 25 to the inner tube space 16, the channel surface per unit active area that transfers the heat to the airflow is nearly constant everywhere. Obviously the flow velocity is accelerated towards the inner, relatively hot space 16. Therefore the heat transfer rate per channel surface is enhanced. The hot regions are cooled more effectively and $\Delta T_{el}$ is reduced compared to a rectangular arrangement having uniform channel distribution.

EXAMPLE 4

Due to the sensitivity of the fuel cell membranes 2 to soluble impurities like NaCl or CaCO$_3$ that are typically present as dust in the air, the air may be cleaned by a filter before being fed into the cell. Otherwise such substances dissolve, migrate into the membrane 2, and block the H$^+$ ion conductivity mechanism. Unfortunately, such filters cause a pressure drop in the air flow and add weight, volume and costs to the fuel cell systems, especially if they are designed according the present invention using high stoichiometric air flow. In order to overcome all of these problems an air filter integrated in the cathode diffusion structure 3 may be used.

In order to avoid the migration of dissolved ions from the channelled air conducting layer 10 to the membrane 2 it is sufficient to apply a strongly hydrophobic layer comprising small pore sizes within the cathode diffusion structure 3. Due to the hydrophobicity and the narrow pore size liquid water is not likely to exist within these pores because of the resulting high surface energy. Water vapour and gases may penetrate such a layer with a rate that is sufficient for application in the cathode of the fuel cell. Even if dust from the air dissolves in product water near the channels 11, the produced ions are prevented from migrating into the membrane 2 because of a lack of liquid water in the filtering layer.

Layers with these above mentioned properties are well known in the field of membrane distillation facilities. Typically they consist of porous stretched PTFE foils. Unfortunately for fuel cell applications, additional high electrical conductivity is recommended. One sheet material that may serve as a filtering barrier layer is "Garbel CL", a product of Gore, Inc Before adding ft between the air conduction layer 10 and the further electrode structures, i.e. 3 and 4, the sheet material has to be compressed by applying a mechanical pressure, preferably in the range of 100 to 800 bars and more preferably in the range of 200 to 350 bars, at elevated temperatures. Improvements may be achieved by impregnating the porous Carbel CL foil with a PTFE/detergent suspension followed by a PTFE sintering process before compressing the sheet material as described above.

Another possibility for a filing layer uses the electrode structure disclosed in Example 4 of WO 00/14816 directly as a filtering layer. As an impregnation material, graphite powder with a particle size of less than 4 µm and a PTFE content of more than 50% has to be used. Advanced filtering properties are gained by compressing this layer before assembling the cell.

EXAMPLE 5

Two possible control and steering functions of the air flow in the fuel cell stack are described below:

First the control and steering of the air flow rate could be done through the temperature as described in WO 00/14816, which is hereby incorporated by reference. To obtain a uniform water balance the operation temperature of the fuel cell stack could be chosen at an optimum by variation of the air flow and the air flow is varied by the speed of the blower generating it.

Another way of controlling and steering the air flow rate is by means of an electronic controlled microprocessor. Again the rotational speed of the blower varies the air flow. The following data have to be measured or calculated to define the needed rotational speed:
a) voltage and current
b) calculation of the waste heat under the assumption that the diffusion losses of the hydrogen migration through the membrane are constant (as a result of earlier tests)
c) air temperature at the inlet (Tin) and outlet (Tout)
d) dT/dt of the inlet and outlet air Under the further assumption that the heat capacity is known and constant all these data allow the microprocessor even in a not stationary modus to define the stoichiometric rate of the air flow. The control is now accomplished through the supply voltage of the motor of the blower (or blowers) with methods common in the field of electronics, in a proportional and/or integral and/or differential steering strategy so that the air flow remains in the interval of 25 to 140 times the stoichiometric rate.

For a fuel cell stack with forty unit cells 1 and a maximum power output of 670 W the air flow needed for the conversion of oxygen and hydrogen by the chemical reaction in the fuel cells of the stack is 19.5 liters per minute in the case of maximum power output. This follows from the fact that 0.058 cubic centimeters of $O_2$ under normal conditions have to be converted to water to obtain an electric charge of 1 coulomb. For said stack a maximum current of 27.9 A is achieved. This results in an oxygen flow of: (0.058 cc/As*27.9 A*40)=64.7 cc/s=3.9 l/min. As there are roughly 20% $O_2$ in the ambient air the required air flow has the above stated value. In order to remove the waste heat from the fuel cell stack for ambient air temperatures between −10° C. and +46° C. and the fuel range of output power levels the blowers have to produce an air flow between approximately 490 l/min and 2720 l/min what means a stoichiometric rate between 25 and 140. With a cell operation temperature within the stack in the vicinity of 60° C. a maxims increase of the temperature of the cooling air flow of roughly 70 Kelvin and 14 Kelvin for an ambient temperature of −10° C. and 46° C. respectively is possible. Assuming an efficiency of the fuel cell stack of approximately 50% a waste heat of 670 Joule per second has to be removed for maximum power output. With the maximum possible temperature increase of the air flow this results in the above stated minimum air flow rates. The air flow necessary to remove the waste heat can be determined experimentally at given ambient temperatures and output power levels by measuring the blowers rotational speed which is related to the air flow they produce. The rotational speed of the blowers is regulated in a way that a certain cell operation temperature which for example is dependent on the cut that is taken off from the stack is maintained within the stack. The experimentally determined air flow rates are in reasonably good accordance with the theoretically expected values. Within the scope of the Gordon the stated stoichiometric rates are adjusted according to the mentioned calculus for fuel cell stacks with different sizes and power outputs.

What is claimed is:

1. A fuel cell system comprising:
   i) at least one active membrane comprising a catalyst sandwiched between an anode layer and a cathode layer,
   ii) a fuel supply having access to the anode layer,
   iii) an air supply having access to the cathode layer for introducing air from the air supply to the fuel cell under pressure,
   iv) the air functioning as an oxidant and as a coolant,
   v) an air filter contained in a single fuel cell cathode side diffusion structure, and
   vi) air penetrating ducts in the cathode layers to allow an airflow parallel to the membrane at a flow rate resulting in a stoichiometric rate in the range of 25 to 140.

2. The fuel cell system of claim 1, wherein the stoichiometric rate is in the range between 45 and 90.

3. The fuel cell system of claim 1, wherein the air flow direction within said fuel cell system is alternatingly reversible after periodic time spans.

4. The fuel cell system of claim 1, wherein the air penetrating ducts are in an air conducting layer disposed adjacent to and in contact with the cathode layer for diffusion.

5. The fuel cell system of claim 4, wherein the air penetrating ducts comprise channels in the cathode layer or in the air conducting layer, and wherein the channels extend along the air flow path.

6. The fuel cell system of claim 5, wherein area of a channel section decreases along a flow direction.

7. The fuel cell system of claim 1, further comprising a fuel cell stack having a parallelepiped geometrical form with a rectangular traverse section.

8. The fuel cell system of claim 7, wherein the air penetrating ducts of the single cell are directed parallel to a short edge of the rectangle.

9. The fuel cell system of claim 1, further comprising a fuel cell stack having a substantially cylindrical geometrical form and plural individual cells, each cell comprising an active area formed as a circular ring, the circular rings in the stack delimiting a central tube within the stack, wherein the air penetrating ducts spread from the central tube and direct the airflow radially through the individual cells.

10. The fuel cell system of claim 9, wherein the fuel cell stack comprises one or two endplates, and wherein the air flow is generated by one or more blowers disposed by the one or two endplates of the fuel cell stack.

11. The fuel cell system of claim 1, further comprising a fuel cell stack with gas separator plates between single fuel cells.

12. The fuel cell system of claim 11, wherein the gas separator plates comprise a material having heat conductivity similar to that of the membrane.

13. The fuel cell system of claim 11, wherein the gas separator plates comprise a foil material of expanded graphite.

14. The fuel cell system of claim 11, wherein a ratio of heat conductivity of the material parallel to the membrane is >0.04 W m²/(kg K).

15. The fuel cell system of claim 1, wherein the air filter is a layer sheet of hydrophobic and porous material.

16. The fuel cell system of claim 15, wherein the material is a porous stretched PTFE foil comprising an electrically conductive material.

17. The fuel cell system of claim 16, wherein the PTFE foil is compressed and impregnated with a PTFE detergent suspension.

18. A method for operating a fuel cell system comprising sandwiching at least one active membrane including a catalyst between an anode layer and a cathode layer, providing a fuel supply access to the anode layer and an air supply access to the cathode layer, introducing air via the air supply under pressure into the fuel cell system, passing the air along the cathode layer and exhausting the air from the fuel cell system, using the air as oxidant and as coolant, wherein the introducing the air into the fuel cell system comprises introducing the air with a flow rate resulting in a stoichiometric rate in the range between 25 and 140, allowing an air flow parallel to the membrane at the flow rate resulting in the stoichiometric rate in the range between 25 and 140 through air penetrating ducts in the cathode layer(s) or a part of the cathode layers, forming channels in the cathode layer or in the air conducting layer as part of the air penetrating ducts, extending the channels along the air flow path, and decreasing area of the channel section along a flow direction.

19. A method for operating a fuel cell system comprising sandwiching at least one active membrane including a catalyst between an anode layer and a cathode layer, providing a fuel supply access to the anode layer and an air supply access to the cathode layer, introducing air via the air supply under pressure into the fuel cell system, passing the air along the cathode layer and exhausting the air from the fuel cell system, using the air as oxidant and as coolant, disposing a fuel cell stack with gas separator plates between single fuel cells, wherein the material of the gas separator plates has a ratio of heat conductivity parallel to the membrane >0.04 W m$^2$/(kg K), wherein the introducing the air into the fuel cell system comprises introducing the air with a flow rate resulting in a stoichiometric rate in the range between 25 and 140, allowing an air flow parallel to the membrane at the flow rate resulting in the stoichiometric rate in the range between 25 and 140 through air penetrating ducts in the cathode layer(s) or a part of the cathode layers.

20. A method for operating a fuel cell system comprising sandwiching at least one active membrane including a catalyst between an anode layer and a cathode layer, providing a fuel supply access to the anode layer and an air supply access to the cathode layer, introducing air via the air supply under pressure into the fuel cell system, passing the air along the cathode layer and exhausting the air from the fuel cell system, using the air as oxidant and as coolant, containing an air filter contained in a single fuel cell cathode side diffusion structure, wherein the introducing the air into the fuel cell system comprises introducing the air with a flow rate resulting in a stoichiometric rate in the range between 25 and 140, allowing an air flow parallel to the membrane at the flow rate resulting in the stoichiometric rate in the range between 25 and 140 through air penetrating ducts in the cathode layer(s) or a part of the cathode layers.

21. A method for operating a fuel cell system, the fuel cell system comprising:
   i) at least one active membrane comprising a catalyst sandwiched between an anode layer and a cathode layer,
   ii) a fuel supply having access to the anode layer,
   iii) an air supply having access to the cathode layer,
   iv) an air filter contained in a single fuel cell cathode side diffusion structure,
   v) air penetrating ducts in the cathode layers to allow an airflow parallel to the membrane at a flow rate resulting in a stoichiometric rate in the range of 25 to 140;
   wherein the method of operating the fuel cell includes the steps of
   a) introducing air from the air supply to the fuel cell under pressure, and
   b) using the air as both oxidant and coolant.

* * * * *